United States Patent
Vaseghi et al.

[11] Patent Number: 5,904,438
[45] Date of Patent: May 18, 1999

[54] METHOD OF TERMINATING A FIBER ROPE

[75] Inventors: Rahim Vaseghi, Bournemouth; John Kenneth Yeardley, London, both of United Kingdom

[73] Assignee: Bridon PLC, South Yorkshire, United Kingdom

[21] Appl. No.: 08/870,884

[22] Filed: Jun. 6, 1997

[30] Foreign Application Priority Data

Jun. 7, 1996 [GB] United Kingdom ............... 96 11 976

[51] Int. Cl.⁶ ..................................................... B23P 3/00
[52] U.S. Cl. ........................... 403/268; 403/404; 29/460; 87/3; 87/5
[58] Field of Search ................... 403/268, 267, 403/275, 277, 248, 334, 404, 374, 218; 29/461; 87/1, 3, 7, 8, 13, 9, 5

[56] References Cited

U.S. PATENT DOCUMENTS

| | | | |
|---|---|---|---|
| 2,803,486 | 11/1957 | Larson et al. | 403/268 X |
| 3,030,851 | 2/1962 | Meyer | 87/5 X |
| 3,036,490 | 9/1962 | Muller et al. | 87/5 X |
| 3,507,949 | 4/1970 | Campbell | 403/267 X |
| 3,660,887 | 5/1972 | Davis | 403/267 X |
| 3,739,457 | 6/1973 | Davis | 403/281 X |
| 4,184,784 | 1/1980 | Killian | 403/267 |
| 4,755,076 | 7/1988 | Salama et al. | 403/275 |
| 4,760,991 | 8/1988 | Asai | 254/134.3 |
| 5,699,657 | 12/1997 | Paulson | 87/13 X |
| 5,735,628 | 4/1998 | Short | 403/218 |

FOREIGN PATENT DOCUMENTS

| | | |
|---|---|---|
| 1341013 | 12/1973 | United Kingdom . |
| 2236546 | 4/1991 | United Kingdom . |
| 2279972 | 1/1995 | United Kingdom . |

Primary Examiner—Harrry C. Kim
Assistant Examiner—John R. Cottingham
Attorney, Agent, or Firm—Nilles & Nilles SC

[57] ABSTRACT

A method of terminating a fiber rope utilizing a device of the type which has a housing member having a frusto-conical bore in which an end portion of the rope can be wedgedly retained. The end portion of the rope has a reinforcing device incorporated therein in order to increase the tensile load capacity of the rope end portion. The reinforcing device may include a fiber type material, a length of fiber rope or a resinous compound applied to the fibers of the rope end portion.

17 Claims, 3 Drawing Sheets

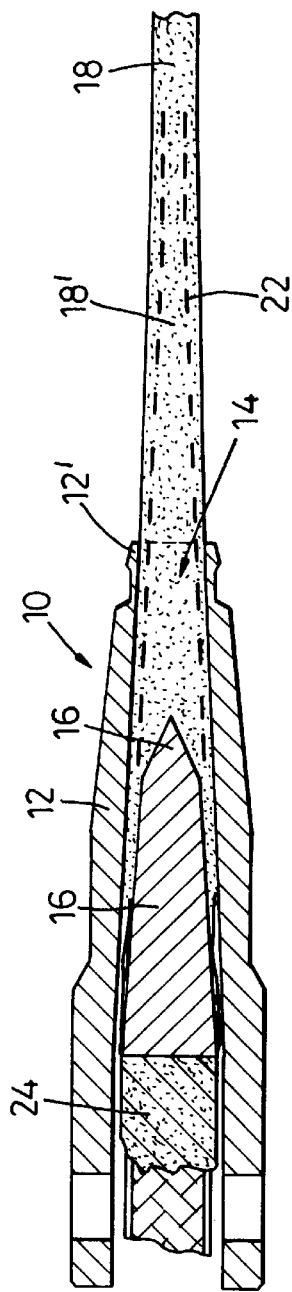
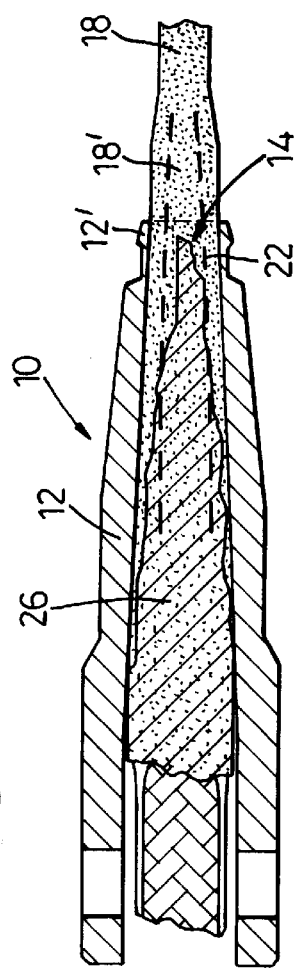
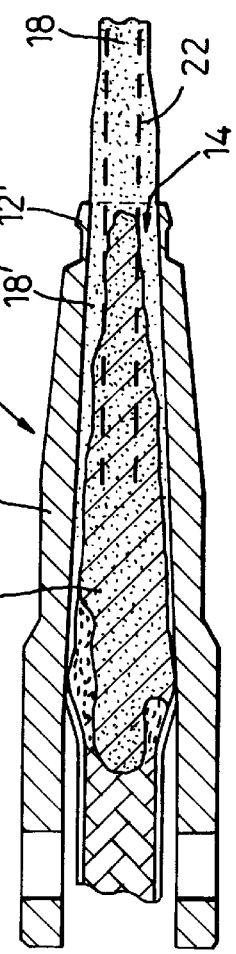

METHOD OF TERMINATING A FIBER ROPE

BACKGROUND OF THE INVENTION

1. Field of the Invention

The present invention relates to a method of terminating a fiber rope utilising a device of the type comprising a housing member having a generally frusto-conical bore in which an end portion of the rope can be wedgedly retained.

2. Description of the Related Art

It is known from GB 1 341 013 to terminate a fiber rope using a device of the abovementioned type. A conically shaped wedge member locates within the fruato-conical bore of the housing member to wedgedly trap fibers of the end portion of the rope within the bore of the housing member thus terminating the rope. The housing member includes a device for attaching it to an anchorage, for example.

It has been that with this method of terminating a rope; that there is a tendency for the fibers of the rope end portion to abrade. Abrasion of the fibers occurs mainly in the region where the fibers contact an apex part of the conically shaped wedge member, although abrasion may also occur at a narrow mouth part of the housing member through which the terminated rope extends. The abrasion of the rope fibers substantially reduces the breaking strength of the rope.

A method of overcoming this problem is suggested in GB 2 236 546 in which the fibers of the rope end portion are treated with a resin composition. The resin composition is employed to provide a lubricating effect on the fibers to reduce abrasion thereof around the apex part of the conically shaped wedge member. Despite this, the combination of tensile load exerted on the rope and the stress induced in the constituent fibers of the rope end portion by the crushing action of the wedge member results in tensile failure of the rope at a point generally in a region extending from around the apex part of the wedge member to the narrow mouth part of the housing member.

U.S. Pat. No. 4,184,784 discloses a method of terminating a raided fiber rope of small diameter. The rope has a diameter of approximately $\frac{1}{10}m^{th}$ inch (0.25 cm) and is combined with a plurality of parallel sections of such rope to be terminated in a single collar having a tapered interior channel. The collar is passed over the ends of the plurality of ropes, and each rope has a short tapered section of rope of the same material inserted in its braided core as a a device of thickening its end. The thickened ends of the plurality of parallel rope sections are separated ("fuzzed") into their individual fibers and a tube having a tapered outer surface is located therebetween. The tube is drawn into the collar by a centering tool and tightly wedges the "fuzzed" parts, plus a significant part of the braided lengths of the ropes, between the tube and collar.

This method is applied to the termination of bundles of very small diameter braided fiber ropes in a single termination device, said terminated bundles of ropes being employed to keep tensile loads from conductors in underwater cables. This method is not suitable for terminating larger diameter fiber ropes because their structures are more resistant to the compression necessary to secure the rope ends between the collar and tube. It will be appreciated from the disclosure of U.S. Pat. No. 4,184,784 that the amount of surface contact between each rope end and the respective surfaces of the channel and tube is restricted.

OBJECTS AND SUMMARY OF THE INVENTION

It is an object of the present invention to obviate or mitigate the aforesaid problems associated with the prior art methods of terminating a fiber rope.

It is a further object of the present invention to provide a method of terminating a fiber rope having a diameter in the order of 1 inch (2.5 cm) or larger. Fibre ropes of this and much larger diameters are employed in marine applications when light weight but high tensile strength are required.

According to a first aspect of the present invention, there is provided a method of terminating a fiber rope, comprising the steps of: introducing into or incorporating in an end portion of the rope for reinforcing said rope end portion; locating said reinforced rope end portion in a generally frusto-conical bore of a housing member; and securing said rope end portion in said housing member bore.

According to a second aspect of the present invention, there is provided a rope terminated using a device comprising a housing member having a generally frusto-conical bore by a method in accordance with the first aspect of the invention.

Further features of the present invention are set out in the appended claims.

BRIEF DESCRIPTION OF THE DRAWINGS

The foregoing and further features of the present invention will be more readily understood from the following description of preferred embodiments, by way of example thereof, with reference to the accompanying drawings, of which:

FIG. 3 is a cross-sectional side view of a rope and a rope end termination device illustrating a second method of terminating a rope in accordance with the present invention;

FIG. 4 is a cross-sectional side view of a rope and a rope end termination device illustrating a third method of terminating a rope in accordance with the present invention;

FIG. 5 is a cross-sectional side view of a rope and a rope end termination device illustrating a fourth method of terminating a rope in accordance with the present invention.

DESCRIPTION OF THE PREFERRED EMBODIMENTS

Figure 1:
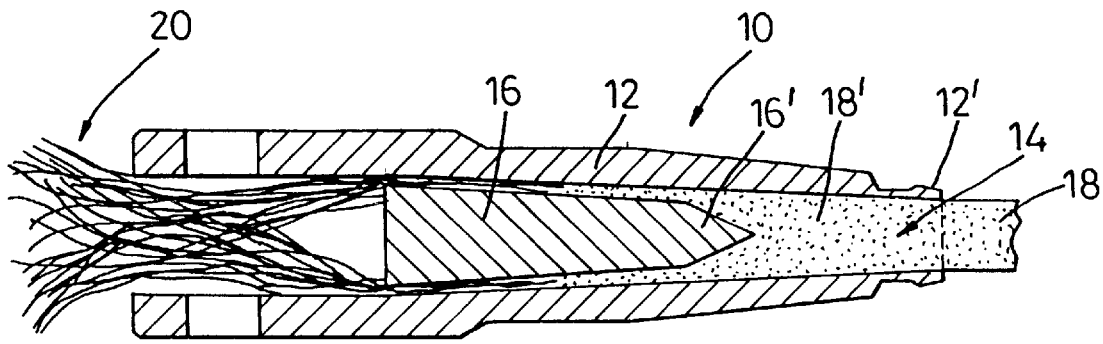
FIG. 1 is a cross-sectional side view of a rope and a rope end termination device illustrating a prior art method of terminating a rope.

Referring to FIG. 1, this illustrates a prior art method of terminating a rope using a rope end termination device 10 of the type comprising a housing member 12 having a generally frusto-conical bore 14 in which a conically shaped wedge member 16 locates to wedgedly retain an end portion 18' of the rope 18 by trapping the fiber 20 comprising the rope end portion 18'. The prior art method comprises passing the rope end portion 18' through the bore 14 of the housing member 12, splaying the fiber 20 of the rope end portion 18' and inserting, apex first, the wedge member 16 generally in the centre of the splayed fibers 20 before drawing the rope end portion 18' back into the housing member 12 such that the wedge member 16 locates within the bore 14 of the housing member 12, trapping the fiber 20 therein. Further tensile load exerted on the rope 18 will cause the rope end portion 18' to become more securely retained within the housing member 12, but the wedge member 16 will exert a greater crushing force on the trapped fiber 20 of the rope end portion 18' which can result in their being damaged. A further problem with this method of terminating a rope is that the fiber 20 of the rope end portion 18' in a region surrounding an apex part 16' of the wedge member 16 tend to become abraded thus substantially reducing the breaking strength of the rope 18. The rope fiber 20 may be treated with a resin to lubricate them and reduce abrasion thereof in and around the apex part 16' of the wedge member 16. However, the fiber 20 of the rope 18 may also become abraded in a region surrounding a mouth part 12' of the housing member 12 and experience has shown that this is the most likely point of tensile failure of the rope 18.

Figure 2A:
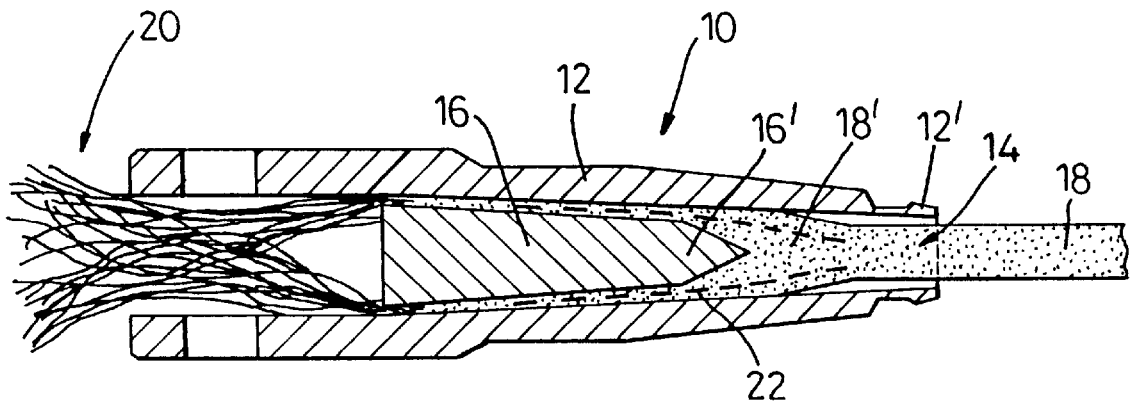
FIG. 2a is a cross-sectional side view of a rope and a rope end termination device illustrating a first method of terminating a rope in accordance with the present invention.

FIG. 2a illustrates a method of terminating a rope end portion in accordance with a first method of the present invention. The device for terminating the rope has a similar structure to that utilised in the prior art method and therefore like numerals will be used to denote like parts.

The first method of the invention comprises introducing into or incorporating in the rope end portion 18' measure to reinforce it such that the breaking strength of the rope end portion 18' in the region surrounding the apex part 16' of the wedge member 16 is increased. In the preferred form of the first method, the reinforcing structure comprises a portion 22 of a fibers rope of similar structure to that of the rope 18 to be terminated, and this is preferably incorporated in the rope end portion 18' by splicing. A tensile load exerted on the rope 18 causes it to constrict such that load on the rope 18 transfers through friction to the fibers of the reinforcing rope portion 22, thus transferring part of the tensile load in the rope fibers 20 away from the apex part 16' of the wedge member 16. In a further preferred form of the first method, the rope 18 to be terminated comprises a braided rope having a hollow construction, and the reinforcing fiber rope portion 22 is located in the hollow part of the rope 18 or is preferably spliced with the strands comprising the rope 18. Constriction of the rope 18 under tensile load causes part of the load to be exerted on the reinforcing fiber rope portion 22, thus substantially increasing the breaking strength of the reinforced rope end portion 18'. The rope end portion 18' may be reinforced such that a reinforced part thereof extends over at least the apex part 16' of the wedge member 16. Whilst the diameter of the mouth part 12' of the housing member is shown as being larger than the diameter of the rope 18, it will be appreciated that, in practice, this need not be so.

Figure 2B:
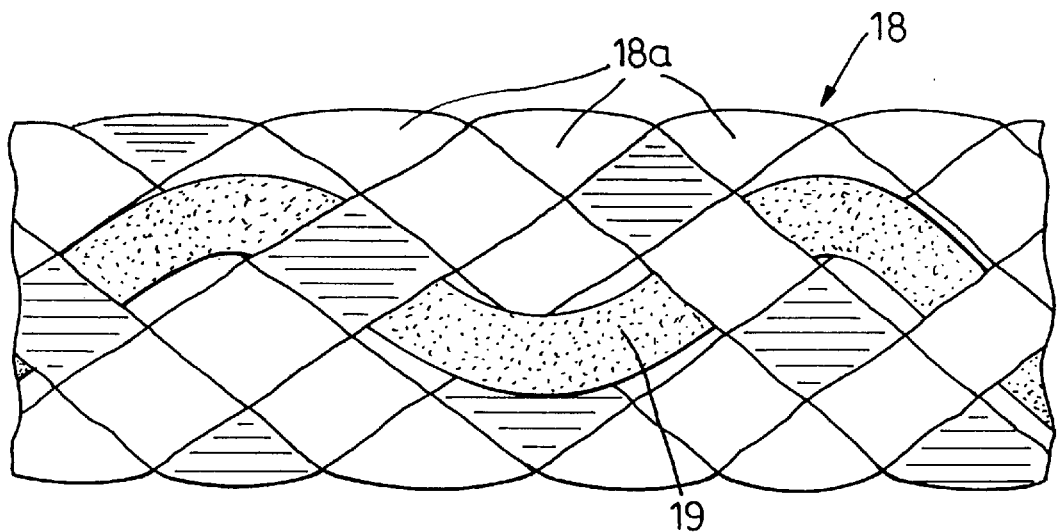
FIG. 2b is an enlarged view of a portion of a braided layer of a fiber rope reinforced in accordance with the first method of the invention.

FIG. 2b shows an enlarged view of a braided layer of a fiber rope 18, reinforced over a part of its length by splicing strands 19 of a reinforcing section of rope of the same structure with strands 18a of the fiber rope 18. For convenience, only one strand 19 of the reinforcing rope is shown in the figure. It will be appreciated that splicing strands (18a and 19) as aforesaid is impracticable with fiber ropes of relatively small diameter. However, for ropes having a diameter of greater than 1 inch (2.5 cm), the strands comprising the rope are of a size which allows splicing to be relatively easily achieved.

The splicing of the reinforcing strands 19 with the strands 18a of the rope 18 greatly increases tensile load transference within the structure of the reinforced rope end when compared to a rope end reinforced with a reinforcing rope section merely inserted within the core of a braided fiber rope.

FIG. 3 illustrates a second method in accordance with the invention. This method is similar to that of the first method. However, it differs in that a longer length end portion 18' of the rope 18 is reinforced with a fiber rope portion 22 such that the reinforced rope end portion 18' extends beyond the mouth part 12' of the housing member 12. In this way, a tensile load exerted on the rope 18 is transferred away from both the region surrounding the apex part 16' of the wedge member 16 and also the mouth part 12' of the housing member 12.

It has been found that by incorporating a reinforcing fiber rope portion 22 of a structure similar to that of the rope 18 to be terminated, it is possible to transfer up to half the tensile load exerted on the rope away from the housing member 12 and thus the breaking strength of the rope is substantially increased. The failure point of the rope 18 will therefore be transferred some distance away from the mouth part 12' of the housing member 12. The reinforced rope end portion 18' may be reinforced over a length which is several times the length of the bore 14 of the housing member 12 thus transferring a portion of the tensile load exerted on the rope 18 a substantial distance away from the housing member 12.

The reinforcing fiber rope portion 22 is preferably formed to have a decreasing number of filaments or fibers along its length such that, when it is introduced into or incorporated in the rope end portion 18', it results in a generally continuous or incremental increase in the number of fibers comprising the reinforced rope end portion 18' in a direction towards a free end of the rope end portion 18'. This contrasts with the rather abrupt increase in rope diameter at a point distant from the housing member 12 which would be the case if the reinforcing fiber rope portion 22 were not formed with a tapered structure. Tapering the reinforcing fiber rope portion 22 has the advantage of transferring a portion of the tensile load exerted on the rope 18 away from the housing member 12 but avoiding an abrupt change in the number of fibers on which the tensile load is exerted at a distance away from the housing member 12. It has been found that, with this arrangement, the breaking strength of the rope is increased further since there is a gentle transition between the number of fibers comprising the reinforced rope end portion 18' and the lesser number of fibers comprising the main or standing part of the terminated rope 18.

The fibers of the reinforced rope end portion 18' may be treated with a resin composition of the type disclosed in UK 2 236 546.

The method may include placing a further resin composition 24 in an end portion of the housing member bore 14 behind the wedge member 16 to bind the loose fibers 20 of the rope end portion 18' at the rear end of the housing member 12.

FIG. 4 illustrates a third method of terminating a rope in accordance with the present invention. This method involves reinforcing the rope end portion 18' in a manner similar to either of the methods described respectively with reference to FIGS. 2 and 3, but a wedge member is not required to secure the rope end portion 18' in the housing member 12. In this method, the reinforced rope end portion 18' is secured by locating it in the bore 14 of the housing member 12 and by pouring a resin composition 26 into the bore 14 of the housing to adhere the fibers 20 comprising the reinforced rope end portion 18' into a conical shape defined by the frusto-conical bore 14 of the housing member 12. Once the resin has set, a tensile load applied to the rope 18 will cause the resin cone 26 formed by the above method to become wedgedly secured in the bore 14 of the housing member 12. Transfer of tensile load exerted on the rope 18 occurs by the same mechanism as in the methods described with reference to FIGS. 2 and 3, respectively.

FIG. 5 illustrates a fourth method in accordance with the present invention. This method is similar to that described with respect to FIG. 3, but differs in that the reinforcing fiber rope portion 22 is preformed with a resin cone 28 at an end thereof and the combined rope portion 22 and resin cone 28 is inserted into the rope end portion 18'. The rope end portion 18' is then drawn into the bore 14 of the housing member 12 where the resin cone 28 wedgedly retains the rope end portion 18' in the housing member 12 and the rope portion 22 reinforces the rope end portion 18'. This method has the advantage of reducing the number of components to be combined when terminating the rope 18.

Figure 6:
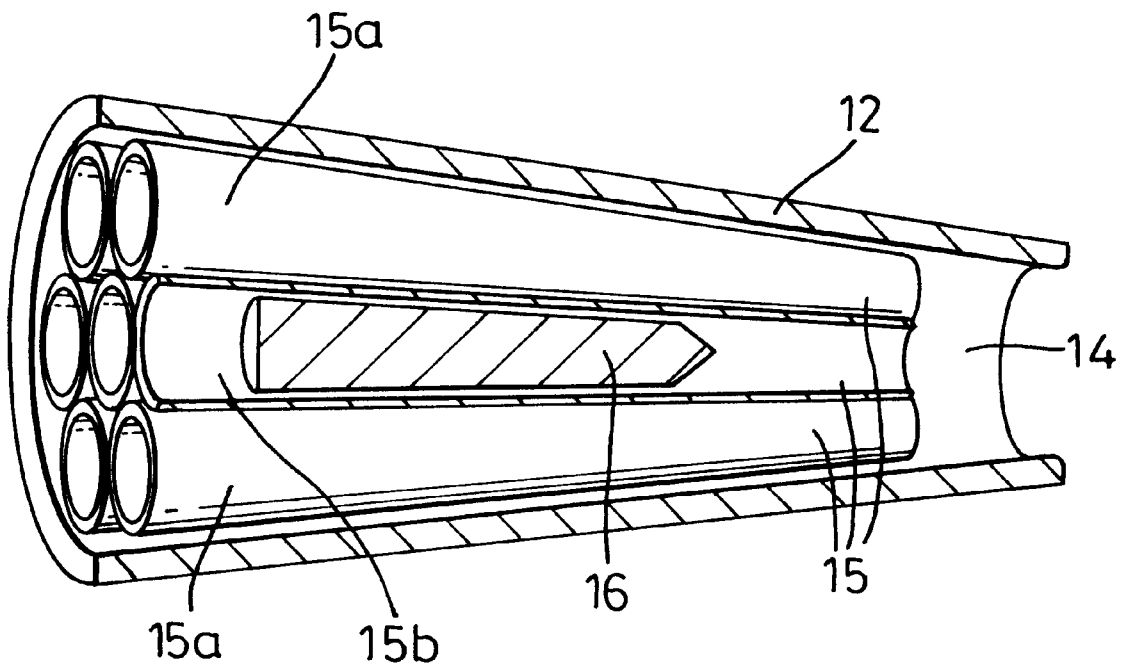
FIG. 6 is a cross-sectional side view of a rope end termination device illustrating a fifth method of terminating a rope in accordance with the present invention.

FIG. 6 illustrates a fifth method of reinforcing a fiber rope in accordance with a fifth method of the present invention. This method is particularly applicable to terminating fiber ropes of relatively large diameter, ie having a diameter in the order of 4 inches (10 cm) or greater.

This method employs a housing member 12 having a frusto-conical bore 14. A plurality of hollow members 15 locate, in use, within the housing member bore 14 in side by side relationship. Each hollow member 15 has a frusto-conical outer surface 15a and a frusto-conical chamber 15b for wedgedly retaining an end of one of a multiplicity of strands comprising a rope (not shown). Each rope end strand can be retained in its respective hollow member 15 in accordance with any one of the first to fourth methods of the invention or any combination thereof, although for purposes of illustration, a frusto-conical wedge member 16 is shown located in a center one of the hollow members 15.

This method of the invention can also be used to terminate a bundle of fiber ropes comprising a plurality of parallel lengths of fiber rope of similar construction for use in heavy duty marine applications.

The methods of the present invention make use of load transference by means of introducing into or incorporating in an end portion of a rope to be terminated a material or process which increases the load bearing characteristics of the rope end portion such that a portion of the tensile load exerted on the rope transfers down the rope away from the reinforced end portion.

Whilst the various methods of the present invention have been described generally with reference to terminating a fiber rope having a braided construction using a reinforcing fiber rope portion also of a braided construction, it will be appreciated that the method can be applied to any fiber rope which is capable of exerting a transverse compressive load when subjected to an axial force (tensile load).

We claim:

1. A method of terminating a fiber rope, comprising the steps of: introducing into or incorporating in an end portion of the rope a reinforcing portion of fiber rope so as to increase a tension load capacity of said rope end portion; locating said reinforced rope end portion in a generally frusto-conical bore of a housing member; and securing said reinforced rope end portion in said housing member bore, wherein the method includes introducing or incorporating the reinforcing portion of fiber rope into less than the entire length of said rope.

2. A method of terminating a fiber rope, comprising the steps of:
   introducing into or incorporating in an end portion of the rope a reinforcing portion of fiber rope so as to increase a tension load capacity of said rope end portion; locating said reinforced rope end portion in a generally frusto-conical bore of a housing member; and securing said reinforced rope end portion in said housing member bore, wherein the method includes the steps of: passing said rope end portion through the bore of the housing member prior to introducing into or incorporating in it the reinforcing portion of fiber rope; and drawing said rope end portion back towards the housing member bore to locate it therein.

3. A method as claimed in claim 1, wherein the reinforcing portion of fiber rope comprises a plurality of filaments or fibers.

4. A method as claimed in claim 3, wherein the method includes reinforcing said rope end portion by splicing some of said fibers or filaments with some of the strands comprising the rope end portion.

5. A method of terminating a fiber rope, comprising the steps of:
   introducing into or incorporating in an end portion of the rope a reinforcing portion of fiber rope so as to increase a tension load capacity of said rope end portion; locating said reinforced rope end portion in a generally frusto-conical bore of a housing member; and securing said reinforced rope end portion in said housing member bore, wherein the reinforcing portion of fiber rope has generally the same structure as the rope to be terminated.

6. A method as claimed in claim 1, wherein the method includes reinforcing said rope end portion over a length which is several times the length of the housing member bore.

7. A method of terminating a fiber rope, comprising the steps of:
   introducing into or incorporating in an end portion of the rope a reinforcing portion of fiber rope so as to increase a tension load capacity of said rope end portion; locating said reinforced rope end portion in a generally frusto-conical bore of a housing member; and securing said reinforced rope end portion in said housing member bore, wherein the reinforcing fiber rope portion has a decreasing number of filaments or fibers along its length, and wherein said reinforcing portion of fiber rope is introduced into or incorporated in the rope end portion with an end thereof having the greater number of filaments or fibers being located nearest the end of the rope to be terminated.

8. A method as claimed in claim 1, wherein the method includes splicing a number of the strands of the reinforcing portion of fiber rope with a number of the strands comprising the rope end portion.

9. A method as claimed in claim 1, wherein the method includes locating the reinforced rope end portion in the housing member bore such that the reinforced end portion extends outwardly beyond a narrow mouth part of the housing member.

10. A method as claimed in claim 9, wherein the method includes locating the reinforced rope end portion in the housing member bore such that a larger part of the reinforced rope end portion extends outwardly beyond the mouth part of the housing member.

11. A method as claimed claim 9, wherein the method includes securing the reinforced rope end portion in the housing member bore by way of a conically shaped wedge member, a resin composition or a combination thereof.

12. A method as claimed in claim 11, wherein where the reinforced rope end portion is secured in the housing member by way of a resin composition only, the method includes introducing the resin composition into the housing member such that the resin composition combined with fibers of the reinforced rope end portion forms wedge means for retaining the reinforced rope end portion in the housing member.

13. A method as claimed in claim 12, wherein the resin composition is introduced into the housing member such that the wedge means so formed extends outwardly from the mouth part of the housing member.

14. A method as claimed in claim 1, wherein the housing member has a plurality of generally frusto-conical members having generally frusto-conical hollow chambers, wherein, in use, 1) each rope strand of the rope end portion comprising multiple rope strands is passed through a respective one of said hollow chambers and 2) secured therein and the frusto-conical members are arranged in juxtaposed relationship within the bore of the housing member such that each of said frusto-conical members contacts at least one adjacent frusto-conical member and such that a load applied to the rope end portion acts through the multiple rope strands in a direction towards a narrower end of the housing member.

15. A combination of a rope terminated with a device comprising a housing member having a generally frusto-conical bore and by a method in accordance with claim 1.

16. A method of terminating a fiber rope, comprising the steps of:
   providing a fiber rope having an end portion;
   introducing or incorporating a reinforcing portion of fiber rope into said end portion of said rope so as to increase the tensile load capacity of said end portion of said rope, thereby reforcing said end portion of said rope relative to another portion of said rope;
   locating part of said reinforced end portion of said rope in a generally frusto-conical bore of a housing member such that said reinforcing portion of fiber rope extends beyond said housing member but extends less than the entire length of said rope; and
   securing said reinforced end portion of said rope in said bore.

17. In combination:
   a fiber rope comprising a reinforced end portion, said reinforced end portion being reinforced with a reinforcing portion of fiber rope that is incorporated or introduced into said reinforced end portion of said rope so as to increase a tensile load capacity of said reinforced end portion of said rope relative to another portion of said rope; and
   a housing member having a generally frusto-conical bore formed therein, wherein part of said reinforced end portion of said rope is disposed within said bore of said housing member, wherein
   said reinforced end portion of said rope is secured to said housing member, and wherein
   said reinforcing portion of fiber rope extends beyond said housing member but does not extend the entire length of said rope.

* * * * *